(12) United States Patent
Yuan et al.

(10) Patent No.: US 8,320,220 B1
(45) Date of Patent: Nov. 27, 2012

(54) METHOD AND SYSTEM FOR PROVIDING AN ENERGY ASSISTED MAGNETIC RECORDING DISK DRIVE HAVING A NON-CONFORMAL HEAT SPREADER

(75) Inventors: Hongxing Yuan, San Ramon, CA (US); Wentao Yan, Fremont, CA (US); Shing Lee, Fremont, CA (US); Zhong Shi, Dublin, CA (US); Jerome Marcelino, Mountain View, CA (US); Yunfei Li, Fremont, CA (US); Zhongyan Wang, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/273,203

(22) Filed: Oct. 13, 2011

(51) Int. Cl.
*G11B 11/00* (2006.01)
(52) U.S. Cl. .................. 369/13.33; 369/112.27
(58) Field of Classification Search ............... 369/13.33, 369/13.32, 13.24, 13.14, 13.02, 13.12, 112.27, 369/112.09, 112.01, 13.35, 13.17, 13.01; 360/59, 125.31, 125.74, 125.75
See application file for complete search history.

(56) References Cited

U.S. PATENT DOCUMENTS

| 4,667,395 | A | 5/1987 | Ahlgren et al. |
| 5,994,747 | A | 11/1999 | Wu |
| 6,746,877 | B1 | 6/2004 | Hornik et al. |
| 6,795,630 | B2 | 9/2004 | Challener et al. |
| 7,272,079 | B2 | 9/2007 | Challener |
| 7,500,255 | B2 | 3/2009 | Seigler et al. |
| 7,885,029 | B2 | 2/2011 | Miyauchi et al. |
| 8,164,855 | B1 * | 4/2012 | Gibbons et al. .......... 360/125.74 |
| 8,248,891 | B2 * | 8/2012 | Lee et al. .................. 369/13.17 |
| 2003/0137772 | A1 | 7/2003 | Challener |
| 2008/0068748 | A1 | 3/2008 | Olson et al. |
| 2009/0073858 | A1 | 3/2009 | Seigler et al. |
| 2010/0061199 | A1 | 3/2010 | Hirara et al. |
| 2010/0104768 | A1 | 4/2010 | Xiao et al. |
| 2010/0123965 | A1 | 5/2010 | Lee et al. |
| 2010/0123967 | A1 | 5/2010 | Batra et al. |
| 2010/0157745 | A1 | 6/2010 | Okada et al. |
| 2010/0214685 | A1 | 8/2010 | Seigler et al. |

* cited by examiner

*Primary Examiner* — Ali Neyzari

(57) ABSTRACT

An energy assisted magnetic recording (EAMR) transducer coupled with a laser is described. The EAMR transducer has an air-bearing surface (ABS) residing near a media during use. The laser provides energy. The transducer includes a waveguide, a near field transducer (NFT) proximate to the ABS, a write pole, a heat spreader, and at least one coil. The waveguide directs the energy from the laser toward the ABS. The NFT is optically coupled with the waveguide, focuses the energy onto the media, and includes a disk having an NFT width. The write pole writes to the media. The heat spreader is thermally coupled with the NFT. A first portion of the heat spreader is between the NFT and the pole, is between the ABS and a second portion of the heat spreader, and has a first width. The second portion has a second width greater than the first width.

22 Claims, 5 Drawing Sheets

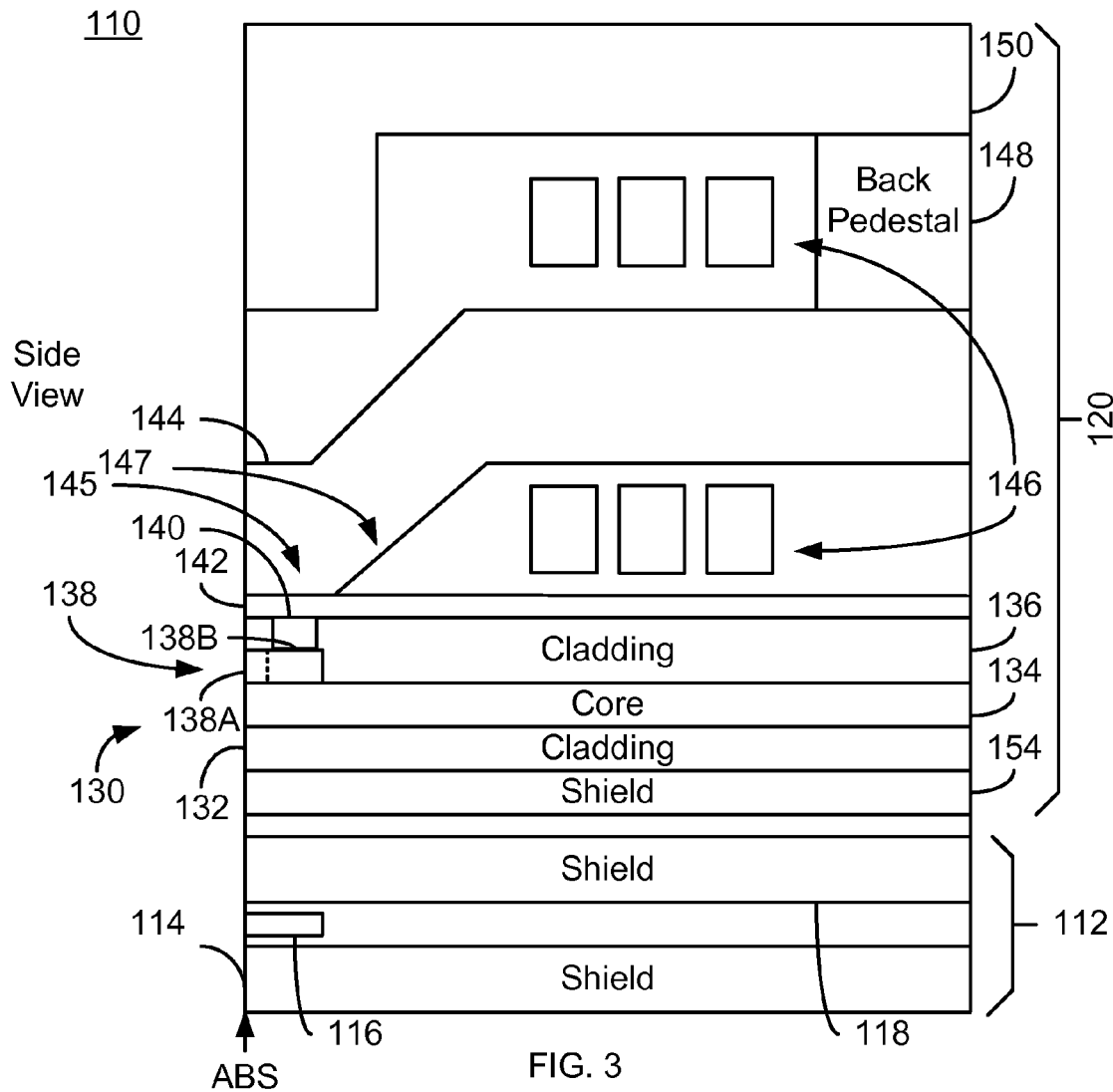
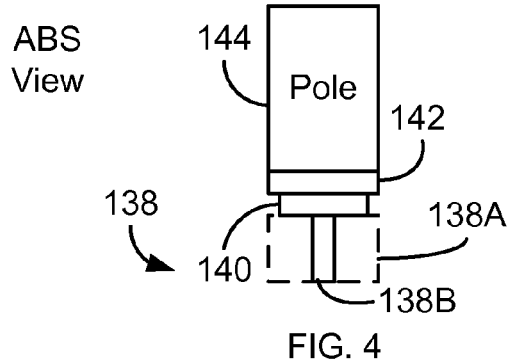
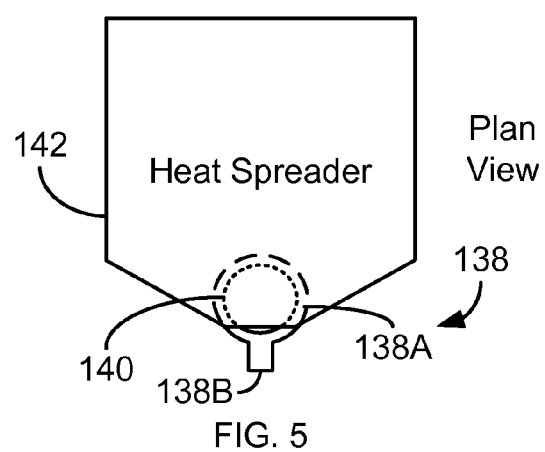

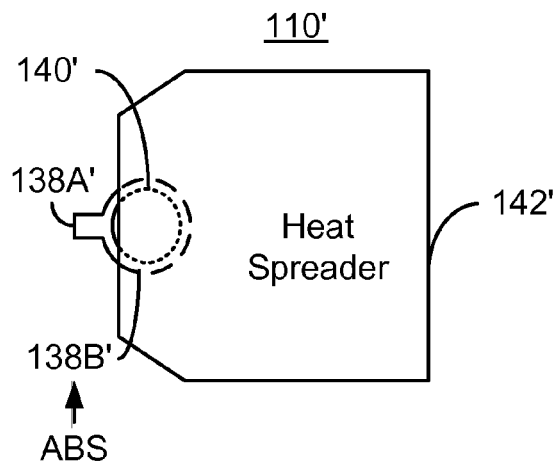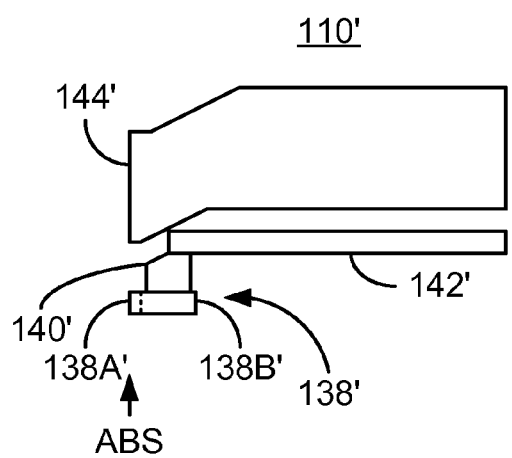
Plan View
FIG. 6
Side View
FIG. 7
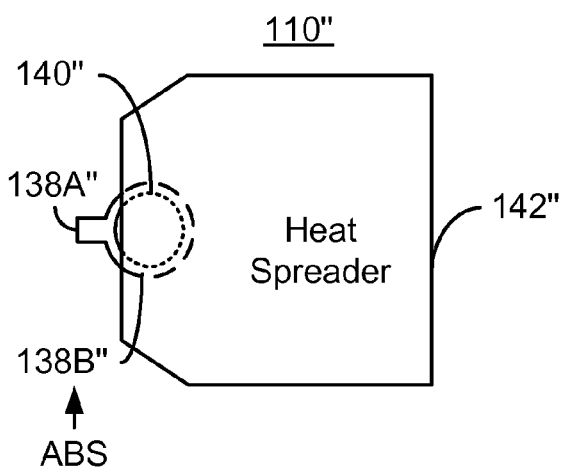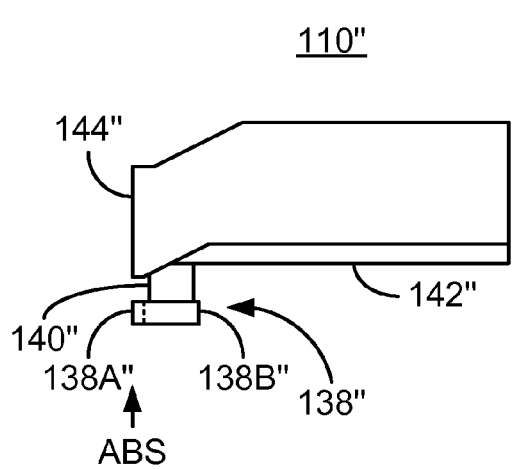
Plan View
FIG. 8
Side View
FIG. 9

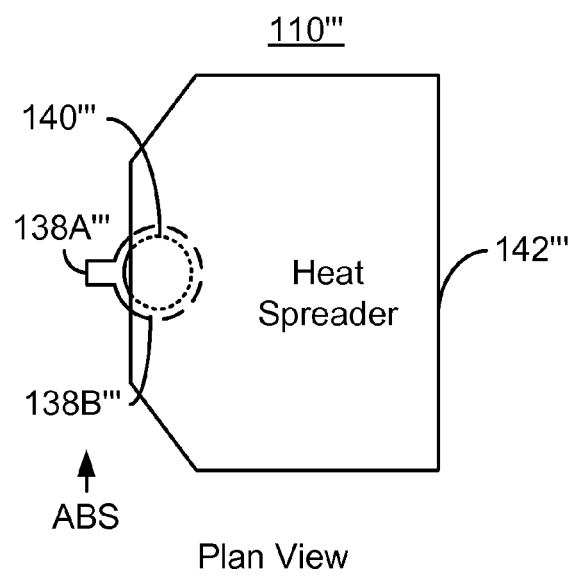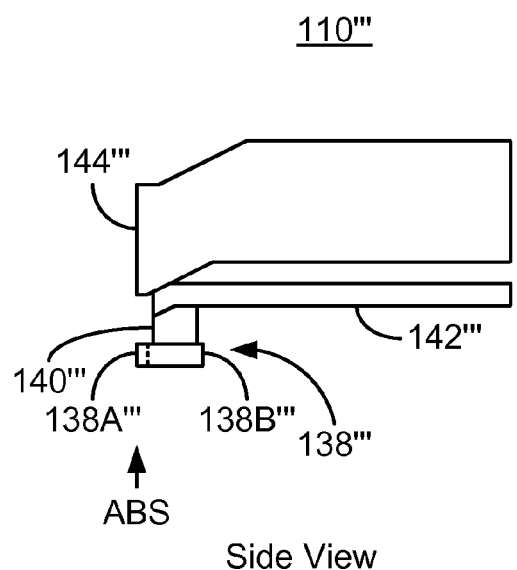
FIG. 10 — Plan View
FIG. 11 — Side View

METHOD AND SYSTEM FOR PROVIDING AN ENERGY ASSISTED MAGNETIC RECORDING DISK DRIVE HAVING A NON-CONFORMAL HEAT SPREADER

BACKGROUND

FIG. 1 depicts top and side views of a portion of a conventional energy assisted magnetic recording (EAMR) transducer 10. For clarity, FIG. 1 is not to scale. The conventional EAMR transducer 10 is used in writing a recording media (not shown in FIG. 1) and receives light, or energy, from a conventional laser (not shown in FIG. 1). The conventional EAMR transducer 10 includes a conventional waveguide 12 having cladding 14 and 16 and core 18, a conventional grating 20, a conventional near-field transducer (NFT) 22, and a conventional pole 30. Light from a laser (not shown) is incident on the grating 20, which coupled light to the waveguide 12. Light is guided by the conventional waveguide 12 to the NFT 22 near the air-bearing surface (ABS). The NFT 22 focuses the light to magnetic recording media (not shown), such as a disk.

In operation, light from the laser is coupled to the conventional EAMR transducer 10 using the grating 20. The waveguide 12 directs light from the grating 12 to the NFT 22. The NFT 22 focuses the light from the waveguide 12 and heats a small region of the conventional media (not shown). The conventional EAMR transducer 10 magnetically writes data to the heated region of the recording media by energizing the conventional pole 30.

Although the conventional EAMR transducer 10 may function, there are drawbacks. The trend in magnetic recording continues to higher recording densities. For example, currently, magnetic recording densities reaching 500-600 Gb/in$^2$ are desired. At such high densities, performance of the conventional NFT 22 may degrade. In some instances, the conventional NFT 22 may be destroyed during use.

Accordingly, what is needed is a system and method for improving performance and reliability of an EAMR transducer.

BRIEF SUMMARY OF THE INVENTION

An energy assisted magnetic recording (EAMR) transducer coupled with a laser is described. The EAMR transducer has an air-bearing surface (ABS) residing near a media during use. The laser provides energy. The transducer includes a waveguide, a near field transducer (NFT) proximate to the ABS, a write pole, a heat spreader, and at least one coil. The waveguide directs the energy from the laser toward the ABS. The NFT is optically coupled with the waveguide, focuses the energy onto a region of the media, and includes a disk having an NFT width in a track width direction. The write pole writes to the region of the media. The heat spreader is thermally coupled with the NFT. A first portion of the heat spreader is between the NFT and the pole and has a first width in the track direction. A second portion of the heat spreader has a second width in the track width direction. The first portion is between the ABS and the second portion. The second width is greater than the first width.

BRIEF DESCRIPTION OF SEVERAL VIEWS OF THE DRAWINGS

FIGS. 3, 4, and 5 depict side, ABS, and plan views of an exemplary embodiment of a portion of an EAMR head.

FIGS. 6-7 depict plan and side views of an exemplary embodiment of a portion of an EAMR transducer.

FIGS. 8-9 depict plan and side views of another exemplary embodiment of a portion of an EAMR transducer.

FIGS. 10-11 depict plan and side views of another exemplary embodiment of a portion of an EAMR transducer.

DETAILED DESCRIPTION OF THE PREFERRED EMBODIMENTS

Figure 1:
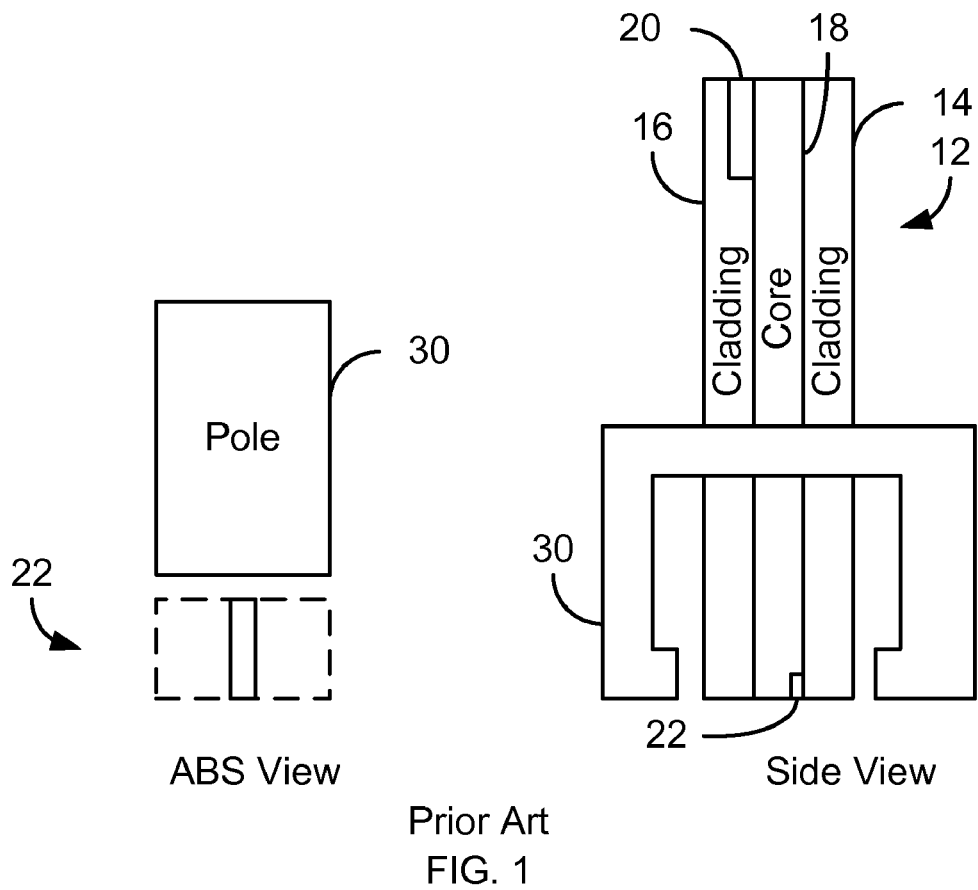
FIG. 1 depicts a side view of a conventional EAMR transducer.
Figure 2:
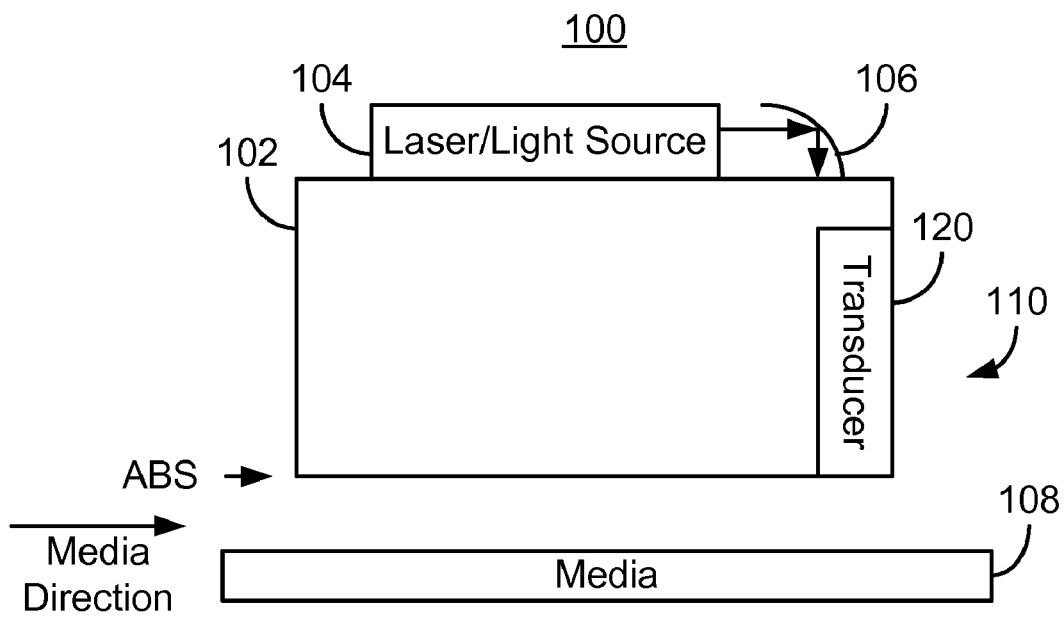
FIG. 2 depicts an exemplary embodiment of a portion of an EAMR disk drive.

FIG. 2 is a diagram depicting a portion of an EAMR disk drive 100. For clarity, FIG. 2 is not to scale. For simplicity not all portions of the EAMR disk drive 100 are shown. In addition, although the disk drive 100 is depicted in the context of particular components other and/or different components may be used. Further, the arrangement of components may vary in different embodiments. The EAMR disk drive 100 includes a slider 102, a laser/light source 104, a mirror or other optics 106 for redirecting light from the laser 104, media 108, and an EAMR head 110. In some embodiments, the laser 104 is a laser diode. Although shown as mounted on the slider 102, the laser 104 may be coupled with the slider 102 in another fashion. For example, the laser 104 might be mounted on a suspension (not shown in FIG. 2) to which the slider 102 is also attached. The media 108 may include multiple layers, which are not shown in FIG. 2 for simplicity.

The EAMR head 110 includes an EAMR transducer 120. The EAMR head 110 may also include a read transducer (not shown in FIG. 2). The read transducer may be included if the EAMR head 110 is a merged head. The EAMR transducer 120 includes optical components (not shown in FIG. 2) as well as magnetic components (not shown in FIG. 2).

FIGS. 3-5 depict side view, ABS, and plan views, respectively, of an exemplary embodiment of a portion of the EAMR head 110. For clarity, FIGS. 3-5 are not to scale. Referring to FIGS. 2-5, for simplicity not all portions of the EAMR head 110 are shown. In addition, although the EAMR head 110 is depicted in the context of particular components other and/or different components may be used. Further, the arrangement of components may vary in different embodiments. The EAMR head 110 may be used in the EAMR disk drive 100. Consequently, similar components have analogous labels. The EAMR head 110 includes a reader transducer 112 and an EAMR transducer 120.

The read transducer 112 includes shields 114 and 118 and reader sensor 116. In some embodiment, the read sensor 116 may be a tunneling magnetoresistance sensor, such as a spin tunneling junction. However, in other embodiments, another sensor may be used.

The EAMR transducer 120 includes waveguide 130, NFT 138, optional heat sink 140, heat spreader 142, write pole 144, back pedestal 148, return pole/shield 150. The EAMR transducer 120 may also include a grating (not shown) that is used to couple light from the laser 104 to the waveguide 130. The coil(s) 146 may be pancake or solenoidal. The coil(s) 146 may be used to energize the write pole 140 during writing.

The waveguide 130 directs energy from the laser 104 to the ABS. The waveguide 130 includes cladding 132 and 136 as well as core 134. The NFT 138 is optically coupled with the waveguide 130, receiving energy from the core 134. The NFT 138 is proximate to the ABS. For example, the NFT 138 is shown as having a surface occupying a portion of the ABS. The NFT 138 is optically coupled with the waveguide 130 and focuses energy from the waveguide onto a region of the media 108. In some embodiments, such as that shown in FIGS. 3-5, the NFT 138 includes a pin 138A and a disk 138B. The pin 138A is between the disk 138B and the ABS. Thus, the disk 138B is recessed from the ABS and thus is shown by a dashed line in FIG. 4. The disk 138B extends further in the track width direction than the pin 138A, as shown in FIGS. 4 and 5. Although termed a disk, the disk 138B of the NFT 138 need not be disk-shaped. For example, instead of having a circular footprint, the disk 138B may be square, rectangular, or have another shape.

The write pole 144 is configured to write to the region of the media heated by the NFT 138. In some embodiments, the pole tip of the write pole 140 does not extend more than across the disk 138A of the NFT in the track width direction, as is shown in FIG. 4. Thus, for example, the width of the write pole 144 in the track width direction may be less than two hundred nanometers. However, in other embodiments, the width of the pole tip of the write pole 144 may differ. The write pole 144 includes NFT-facing surface 145 and bottom surface 147. The NFT-facing surface 145 faces NFT 138 and may be substantially parallel to the top surface of the NFT 138. The bottom surface 147 slopes away from the NFT. Although shown as extending past the NFT 138, the NFT-facing surface 145 may not extend as far from the ABS as the NFT 138. In some embodiments, the NFT-facing surface 145 may be omitted or extend a negligible distance from the ABS. A pole that omits the NFT-facing surface may be termed a zero throat height pole as the back surface 147 extends substantially to the ABS. In other embodiments, the back surface 147 might not be sloped or be sloped in another manner. The magnetic portion 144 has a pole thermal conductivity. The write pole 144 may also include one or more high saturation magnetization material(s).

A heat sink 140 is also shown. In some embodiments, the heat sink 140 resides on the disk 138B of the NFT 138. The heat sink 140 may include Au, Cu and/or other thermally conductive material(s). In some embodiments, the footprint of the heat sink 140 is substantially the same as that of the disk 138B. For example, the heat sink 140 may have a circular footprint. In other embodiments, the heat sink 140 may have a different footprint than the disk 138B of the heat sink 138. In some embodiments, the heat sink 140 may not occupy all of the disk 138B of the heat sink 138. For example, the heat sink 140 may have a smaller diameter than the disk 138B of the heat sink 138. Such an embodiment is shown in FIGS. 3-5. In other embodiments, the heat sink 140 may extend to the edges of the disk 138B of the NFT 138, or beyond. The heat sink 140 thermally couples the NFT 138 with the heat spreader 142. However, in other embodiments, the head spreader 142 may be thermally coupled with the NFT 138 in another manner. For example, the heat spreader 142 may be in direct, physical contact with or very closely spaced away from the NFT 138.

The heat spreader 142 is nonmagnetic has a high thermal conductivity. In some embodiments, the thermal conductivity of the heat spreader 142 is substantially the same as that of the heat sink 140 and/or greater than the thermal conductivity of the pole 144. For example, the heat spreader 142 might include materials such as gold, copper, silver, aluminum, their alloys, aluminum nitride, beryllium oxide and/or other high thermal conductivity materials. As used herein, a high thermal conductivity material has a thermal conductivity greater than the thermal conductivity of the pole 144. For example some high thermal conductivity materials may have a thermal conductivity on the order of 80-100 W/mK or more. Some such materials may have a thermal conductivity of 150 W/mK or more. Other materials may have a thermal conductivity of 200 W/mK or more. Thus, the heat spreader 142 might be electrically conductive or electrically insulating. Further, the head spreader 142 may include a single material, an alloy, multiple materials or alloys, a multilayer and/or another structure. For example, a high thermal conductivity composite including both insulating and conducting materials may also be used for the heat spreader 142.

In addition to a high thermal conductivity, the heat spreader 142 is also thermally coupled with at least the NFT 138. In some embodiments, the heat spreader 142 is also thermally coupled with the pole 144. The heat spreader 142 has a width in the track width direction that is larger distal from the ABS. This can be seen in FIGS. 4-5. Thus, the heat spreader 142 may be viewed as having a first width closer to the ABS and a second width greater than the first width a distance from the ABS. In some embodiments, the heat spreader 142 is wider than the pole 144 distal from the ABS. In other embodiments, the heat spreader 142 may have a width that is the same as or smaller than the pole 144. In some embodiments, the heat spreader 142 extends to the ABS. In other embodiments, the heat spreader 142 might be recessed from the ABS. In some embodiments, the heat spreader 142 has the same width as the pole 144 at the ABS. However, in other embodiments, the width of the heat spreader 142 may differ at the ABS. In addition to being thermally conductive, the heat spreader 142 has a greater width further from the ABS. As a result, the heat spreader 142 is able to spread the heat from the NFT 138 over a larger area of the transducer 120. Dissipation of the heat from the NFT 138 and, in some embodiments, the pole 144, may be improved.

In addition to being wider further from the ABS, at least a portion of the heat spreader 142 also extends in a direction substantially perpendicular to the ABS. In some embodiments, the wider portion of the heat spreader away from the ABS is substantially planar. In other embodiments, the entire heat spreader 142 may be substantially planar. This may be seen in FIG. 3. The heat spreader 142 extends in a stripe height direction (to the right in FIG. 3) away from the ABS. Thus, the portion of the heat spreader 142 further from the ABS may not conformal with the pole 144. The heat spreader 142 may also not be conformal with the heat sink 140.

The heat spreader 142 has an optical absorption of the energy from the laser 104. In such embodiments, the pole 144 has a pole optical absorption of the energy from the laser 104. In some embodiments, the optical absorption of the heat spreader 142 is less than the pole optical absorption. In some such embodiments the heat spreader thermal conductivity is also greater than the pole thermal conductivity.

The thickness of the heat spreader 142 may also be configured. For example, in some embodiments, heat spreader 142 has a thickness not less than a skin depth corresponding to the energy from the laser 104. In some such embodiments, the thickness of the heat spreader 142 is at least twice the skin depth at the working wavelength of the laser 104. In some embodiments, the heat spreader 142 is at least fifty nanometers thick. In such embodiments, the pole 144 may absorb significantly less energy from the laser. In some embodiments, the thickness of the heat spreader 142 may be not more than three times the skin depth at the working wavelength of the laser 104. Thus, materials for the heat spreader 142 may be relatively quickly deposited. In other embodiments, the thickness of the heat spreader 142 may vary. For example, the portion of the heat spreader 142 between the pole 144 and the NFT 138 may be at least fifty nanometers thick, while another portion of the heat spreader 142 might have a different thickness. In some embodiments, the total distance between the core 134 and the bottom of the pole 144 is desired to be kept constant. Consequently, the portion of the heat spreader 142 directly above the NFT 138 may have a constant thickness. However, away from the NFT 138, the portion of the heat spreader 142 along the bottom surface 147 of the pole 144 may have a different and/or varying thickness.

The EAMR head 110 has improved thermal management. The heat spreader 142 may improve the thermal conductivity of the region of the NFT 138 and the write pole 144. Thus, heat may be channeled from the NFT 138 to the heat spreader 142 and be dissipated over a wider area of the EAMR transducer 120. Consequently, heat damage to the NFT 138 may be mitigated or prevented. In embodiments in which the heat spreader 142 is thermally coupled with the write pole 144, heat from the write pole 144 may also be dissipated. In some embodiments, the optical absorption of the heat spreader 142 is less than that of the write pole 144. The heat spreader 142 may also have a thickness that is greater than the skin depth of the energy, or light, used. In such embodiments, the write pole 144 may have reduced absorption of the laser energy used in the EAMR head 110. Consequently, the write pole 144 may undergo less heating. As a result, there may be less thermal protrusion of the write pole 144. Consequently, the fly height of the EAMR head 110 may be made more stable. Because it may be nonmagnetic, the heat spreader 142 may provide such benefits substantially without affecting the magnetic characteristics of the write pole 144. Further, the heat spreader 142 is not conformal with the write pole 144. The heat spreader 142 may thus be simpler to fabricate. For example, in some embodiments, the heat spreader 142 may be deposited in a single layer. Thus, performance, reliability, and manufacturability of the EAMR head 110 may be improved.

FIGS. 6-7 depict plan and side views of an exemplary embodiment of a portion of an EAMR write head 110'. The EAMR head 110' is analogous to the EAMR head 110. Thus, analogous components have similar labels. For simplicity, only the heat sink 140', heat spreader 142', and NFT 138' having portions 138A' and 138B' are shown. For clarity, FIGS. 6-7 are not to scale. In addition, although the EAMR head 110' is depicted in the context of particular components other and/or different components may be used. Further, the arrangement of components may vary in different embodiments. Note that one or more of the features depicted in FIGS. 6-7 may be combined in the EAMR head 110 depicted in FIGS. 3-5. The EAMR head 110' may be used in the EAMR disk drive 100.

In the embodiment shown, the heat sink 140' has a sloped front surface. Further, the heat spreader 142' is recessed from the ABS. The heat spreader 142' also only extends over a portion of the disk 138B' of the NFT 138'. In the embodiment shown, the heat spreader 142' also contacts only the flat (perpendicular to the ABS) portion of the top of the heat sink 140'. The heat spreader 142' may or may not be thermally coupled with the pole 144'. Further, the heat spreader is wider than the NFT 138' at its front, closest to the ABS. In some embodiments, the heat spreader 142' is also wider than the pole (not shown in FIG. 6) at its front portion closer to the ABS and/or the back portion distal from the ABS.

The EAMR head 110' may share the benefits of the EAMR head 110. For example, the heat spreader 142' may improve thermal management for the NFT 138' and the pole 144'. The heat spreader 142' may conduct heat away from the NFT 138' and spread the heat over a wider area for dissipation. The heat spreader 142' may also prevent absorption of the light from the laser 104 by the pole 144'. Thus, the pole 144' may undergo less heating. Further, the heat spreader 142' may be relatively simple to fabricate. Thus, performance, reliability, and fabrication may be improved.

FIGS. 8-9 depict plan and side views of an exemplary embodiment of a portion of an EAMR write head 110". The EAMR head 110" is analogous to the EAMR heads 110 and 110'. Thus, analogous components have similar labels. For simplicity, only the heat sink 140", heat spreader 142", and NFT 138" having portions 138A" and 138B" are shown. For clarity, FIGS. 8-9 are not to scale. In addition, although the EAMR head 110" is depicted in the context of particular components other and/or different components may be used. Further, the arrangement of components may vary in different embodiments. Note that one or more of the features depicted in FIGS. 8-9 may be combined in the EAMR head 110 depicted in FIGS. 3-5. The EAMR head 110" may be used in the EAMR disk drive 100.

In the embodiment shown, the heat sink 140" has a sloped front surface. The heat spreader 142" is recessed from the ABS. The heat spreader 142" also only extends over a portion of the disk 138B' of the NFT 138". In the embodiment shown, the heat spreader 142" also contacts only the flat (perpendicular to the ABS) portion of the top of the heat sink 140". The heat spreader 142" is conformal with the pole 144" near the sloped surface. However, the remainder of the head spreader 142" extends substantially perpendicular to the ABS and may not be conformal with the pole 144". Further, the heat spreader 142" is wider than the NFT 138" at its front, closest to the ABS. In some embodiments, the heat spreader 142" is also wider than the pole (not shown in FIG. 8) at its front portion closer to the ABS and/or the back portion distal from the ABS.

The EAMR head 110" may share the benefits of the EAMR heads 110 and/or 110'. For example, the heat spreader 142" may improve thermal management for the NFT 138" and the pole 144". The heat spreader 142" may conduct heat away from the NFT 138" and tip of the pole 144". The heat spreader 142" also spreads the heat over a wider area for dissipation. The heat spreader 142" may also prevent absorption of the light from the laser 104 by the pole 144". Thus, the pole 144" may undergo less heating. Further, the heat spreader 142" may be relatively simple to fabricate. Thus, performance, reliability, and fabrication may be improved.

FIGS. 10-11 depict plan and side views of an exemplary embodiment of a portion of an EAMR write head 110'''. The EAMR head 110''' is analogous to the EAMR heads 110, 110', and 110". Thus, analogous components have similar labels. For simplicity, only the heat sink 140''', heat spreader 142''', and NFT 138''' having portions 138A''' and 138B''' are shown. For clarity, FIGS. 10-11 are not to scale. In addition, although the EAMR head 110''' is depicted in the context of particular components other and/or different components may be used. Further, the arrangement of components may vary in different embodiments. Note that one or more of the features depicted in FIGS. 10-11 may be combined in the EAMR head 110 depicted in FIGS. 3-5. The EAMR head 110''' may be used in the EAMR disk drive 100.

In the embodiment shown, the heat sink 140''' has a sloped front surface. The heat spreader 142''' is recessed from the ABS. The heat spreader 142''' also only extends over the heat sink 140'''. In the embodiment shown, the heat spreader 142''' also contacts both the flat (perpendicular to the ABS) portion and the sloped portion of the top of the heat sink 140'''. The heat spreader 142" is conformal with the pole 144''' and the heat sink 140" near the sloped surface. However, the remainder of the head spreader 142''' extends substantially perpendicular to the ABS and is not conformal with the pole 144'''. Further, the heat spreader 142''' is wider than the NFT 138''' at its front, closest to the ABS. In some embodiments, the heat spreader 142''' is also wider than the pole (not shown in FIG. 10) at its front portion closer to the ABS and/or the back portion distal from the ABS.

The EAMR head 110''' may share the benefits of the EAMR heads 110, 110' and/or 110". For example, the heat spreader 142''' may improve thermal management for the NFT 138''' and the pole 144'''. The heat spreader 142" may conduct heat away from the NFT 138''' and tip of the pole 144'''. The heat spreader 142''' may spread the heat over a wider area for dissipation. The heat spreader 142''' may also prevent absorption of the light from the laser 104 by the pole 144'''. Thus, the pole 144''' may undergo less heating. Further, the heat spreader 142''' may be relatively simple to fabricate. Thus, performance, reliability, and fabrication may be improved.

Figure 12:
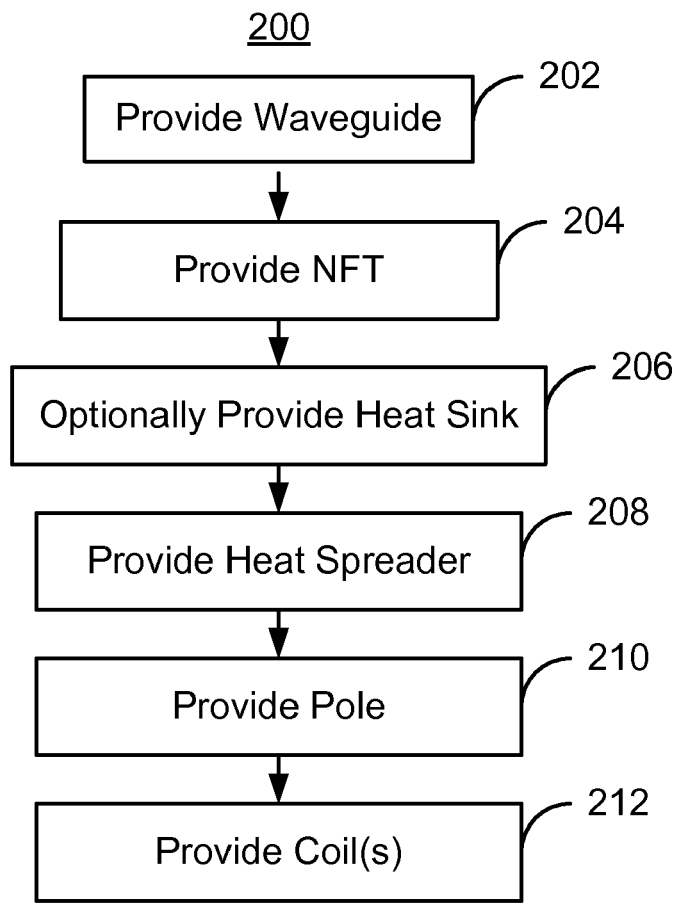
FIG. 12 depicts an exemplary embodiment of a method of forming a portion of an EAMR transducer.

FIG. 12 depicts an exemplary embodiment of a method 200 of forming a portion of an EAMR head. For simplicity, some steps may be omitted, combined, and/or performed in another sequence. The method 200 is described in the context of the EAMR disk drive 100 and EAMR head 110. However, the method 200 may be used to fabricate other EAMR heads, including but not limited to EAMR heads 110', 110", and 110'''. In addition, the method 200 is described in the context of fabricating a single disk drive 100. However, multiple transducers may be fabricated substantially in parallel. Further, although described as separate steps, portions of the method 200 may be interleaved.

The waveguide 130 is provided, via step 202. Step 202 includes fabricating the components 132, 134, and 136. In addition, the grating(s) (not shown) and other optical components may be fabricated. The NFT 138 may be provided, via step 204. Step 204 includes fabricating the disk 138B and pin 138A of the NFT 138.

The heat sink 140 is optionally provided, via step 206. In some embodiments, step 206 includes forming a heat sink post having a footprint similar to that of the disk 138B. Step 206 may also include removing a portion of the heat sink post such that at least a portion of the top surface of the heat sink 140 is sloped. In some embodiments, the sloped portion of the heat sink 140 is conformal with the pole 144.

The heat spreader 142 is provided via step 208. The heat spreader 142 is thermally coupled with the NFT 138 and, in some embodiments, with the pole 144. If the heat sink 140 is used, then the heat spreader 142 may be thermally coupled with the NFT 138 through the heat sink 140. The heat spreader 142 is wider further from the ABS and may extend substantially perpendicular to the ABS. Thus, the heat spreader 142 may not be conformal with the pole 144. Step 206 may include depositing a layer of thermally conductive material and patterning the layer to have the desired widths.

The write pole 144 is provided, via step 210. Step 210 may include fabricating the NFT facing surface 145 and the sloped surface 147. Step 210 may include depositing one or more high saturation magnetization material(s). The coil(s) 146 may then be provided, via step 212. Thus, using the method 200, the benefits of the EAMR head 110, 110', 110", and/or 110''' may be achieved.

Figure 13:
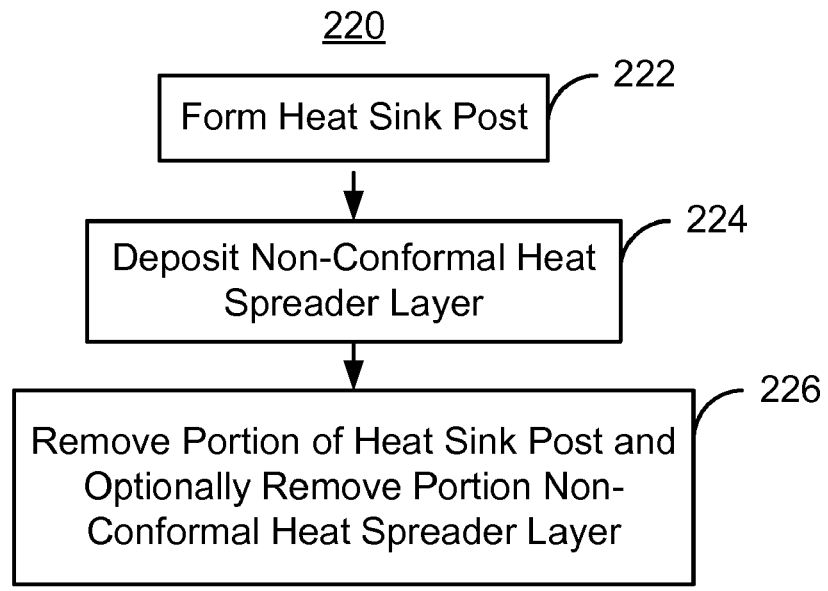
FIG. 13 depicts an exemplary embodiment of a method of forming a portion of an EAMR transducer.

FIG. 13 depicts an exemplary embodiment of a method 220 of forming a portion of an EAMR head. For simplicity, some steps may be omitted, combined, and/or performed in another sequence. The method 220 is described in the context of the EAMR disk drive 100 and EAMR heads 110' and 110". However, the method 220 may be used to fabricate other EAMR heads, including but not limited to EAMR heads 110 and 110'''. In addition, the method 220 is described in the context of fabricating a single disk drive 100. However, multiple transducers may be fabricated substantially in parallel. Further, although described as separate steps, portions of the method 220 may be interleaved.

A heat sink post is provided, via step 222. The heat sink post may be the heat sink 140'/140" prior to formation of the sloped surface at the top.

One or more thermally conductive material(s) for the heat spreader 142'/142" may be deposited, via step 224. Step 224 may also include patterning the layer such than the portion of the heat spreader 142'/142" closer to the ABS is less wide than the portion of the heat spreader 142/142" further from the ABS. For example, the thermally conductive material(s) may be deposited, and then a portion of the material(s) removed. Alternatively, a mask having an aperture of the desired footprint or a trench having the desired footprint for the heat spreader 142'/142" may be provided and the heat spreader 142'/142" material deposited.

At least a portion of the heat sink post is removed, via step 226. Thus, the heat sink 140'/140" is formed. If the thermally conductive material(s) for the heat spreader 142'/142" have already been deposited, then a portion of these materials are removed. Thus, the heat sink 140" and heat spreader 142" may be formed. In such an embodiment, step 224 occurs before step 226. If the material(s) for the heat spreader 142' have not been deposited, then step 226 occurs before step 224. Thus, the heat spreader 142' may be provided. Thus, using the method 220, the heat spreader 142'/142" and heat sink 140'/140" may be formed. The benefits of the EAMR head 110' and/or 110" may be achieved.

We claim:

1. An energy assisted magnetic recording (EAMR) transducer coupled with a laser for providing energy and having an air-bearing surface (ABS) configured to reside in proximity to a media during use, the EAMR transducer comprising:
    a waveguide configured to direct the energy from the laser toward the ABS;
    a near field transducer (NFT) proximate to the ABS, the NFT being optically coupled with the waveguide and for focusing the energy onto a region of the media, the NFT including a disk having an NFT width in a track width direction;
    a write pole configured to write to the region of the media;
    a heat spreader thermally coupled with the NFT, a first portion of the heat spreader residing between the NFT and the pole and having a first width in the track direction, a second portion of the heat spreader having a second width in the track width direction, the first portion being between the ABS and the second portion, the second width being greater than the first width; and
    at least one coil for energizing the write pole.

2. The EAMR transducer of claim 1 wherein at least the second portion of the heat spreader is substantially planar and extends in a stripe height direction substantially perpendicular to the ABS.

3. The EAMR transducer of claim 1 wherein the write pole has a pole width, the second width of the heat spreader being greater than the pole width.

4. The EAMR transducer of claim 1 wherein the heat spreader is substantially planar and extends in a stripe height direction substantially perpendicular to the ABS.

5. The EAMR transducer of claim 1 wherein the heat spreader includes at least one of gold, copper, aluminum, aluminum nitride, and beryllium oxide.

6. The EAMR transducer of claim 1 wherein the heat spreader has a thickness and a skin depth for the energy, the thickness being at least the skin depth.

7. The EAMR transducer of claim 6 wherein the thickness is not more than three multiplied by the skin depth.

8. The EAMR transducer of claim 6 wherein thickness is at least twice the skin depth.

9. The EAMR transducer of claim 1 further comprising;
a heat sink thermally coupled with the NFT and the heat spreader, the heat sink residing between the disk and the heat spreader.

10. The EAMR transducer of claim 9 wherein the heat sink has a heat sink width in the track width direction, the heat sink width being not greater than the disk width.

11. The EAMR transducer of claim 9 wherein the heat sink has a top surface, a portion of the top surface being substantially conformal with the write pole.

12. The EAMR transducer of claim 11 wherein a third portion of the heat spreader is substantially conformal with the write pole.

13. The EAMR transducer of claim 1 wherein the heat spreader is thermally coupled with the write pole.

14. The EAMR transducer of claim 1 wherein the first width of the first portion of the heat spreader is at least as large as the NFT width.

15. An energy assisted magnetic recording (EAMR) transducer coupled with a laser for providing energy and having an air-bearing surface (ABS) configured to reside in proximity to a media during use, the EAMR transducer comprising:
a waveguide configured to direct the energy from the laser toward the ABS;
a near field transducer (NFT) proximate to the ABS and extending a distance from the ABS into the EAMR transducer, the NFT being optically coupled with the waveguide and for focusing the energy onto a region of the media, the NFT including a disk and a pin between the disk and the ABS;
a write pole configured to write to the region of the media;
a heat sink thermally coupled with the disk of the NFT and having a top surface, the heat sink residing between the disk of the NFT and the write pole, at least a portion of the top surface of the heat sink being conformal with the write pole;
a heat spreader thermally coupled with the NFT and having a skin depth corresponding to the energy, a first portion of the heat spreader residing between a portion of the heat sink and the pole, the first portion of the heat spreader having a first width in the track direction, a second portion of the heat spreader having a second width in the track width direction, the first portion being between the ABS and the second portion, the first width at least as large as the NFT width, the second width being greater than the first width, at least the second portion of the heat spreader being substantially planar, the second portion of the heat spreader having a thickness and extending in a stripe height direction substantially perpendicular to the ABS, the thickness being at least twice the skin depth and not more than thrice the skin depth; and
at least one coil for energizing the pole.

16. An energy assisted magnetic recording (EAMR) disk drive comprising:
a slider having an air-bearing surface (ABS) configured to reside in proximity to a media during use;
a laser coupled with the slider for providing energy;
an EAMR transducer coupled with the slider and including a waveguide configured to direct the energy from the laser toward the ABS, a near field transducer (NFT), a write pole, a heat spreader, and at least one coil, the NFT residing proximate to the ABS, the NFT being optically coupled with the waveguide and for focusing the energy onto a region of the media, the write pole being configured to write to the region of the media, the at least one coil for energizing the write pole, the heat spreader being thermally coupled with the NFT, a first portion of the heat spreader residing between the NFT and the pole and having a first width in the track direction, a second portion of the heat spreader having a second width in the track width direction, the first portion being between the ABS and the second portion, the second width being greater than the first width.

17. A method for providing an energy assisted magnetic recording (EAMR) transducer coupled with a laser for providing energy and having an air-bearing surface (ABS) configured to reside in proximity to a media during use, the method comprising:
providing a waveguide configured to direct the energy from the laser toward the ABS;
providing a near field transducer (NFT) proximate to the ABS, the NFT being optically coupled with the waveguide and for focusing the energy onto a region of the media, the NFT including a disk having an NFT width in a track width direction;
providing a write pole configured to write to the region of the media;
providing a heat spreader thermally coupled with the NFT, a first portion of the heat spreader residing between the NFT and the pole and having a first width in the track direction, a second portion of the heat spreader having a second width in the track width direction, the first portion being between the ABS and the second portion, the first width at least as large as the NFT width, the second width being greater than the first width; and
providing at least one coil for energizing the write pole.

18. The method of claim 17 wherein at least the second portion of the heat spreader is substantially planar and extends in a stripe height direction substantially perpendicular to the ABS.

19. The method of claim 17 wherein the write pole has a pole width, the second width being greater than the pole width.

20. The method of claim 17 wherein the heat spreader has a thickness and a skin depth for the energy, the thickness being at least the skin depth and not more than thrice the skin depth.

21. The method of claim 17 further comprising;
providing a heat sink thermally coupled with the NFT and the heat spreader, the heat sink residing between the disk and the heat spreader.

22. The method of claim 21 wherein the step or providing the heat sink further includes:
forming a heat sink post on the disk; and
after a heat spreader layer is deposited on the heat sink post, removing a portion of the heat sink post, thereby forming a heat sink having a sloped top surface.

* * * * *